United States Patent

[11] 3,547,270

| [72] | Inventor | Charles L. Kass<br>19 Country Club Drive, White Plains, N.Y.<br>18607 |
|---|---|---|
| [21] | Appl. No. | 724,079 |
| [22] | Filed | April 25, 1968 |
| [45] | Patented | Dec. 15, 1970 |

[54] PRESSURIZED SELF-CLEANING FILTER TANK
5 Claims, 8 Drawing Figs.

[52] U.S. Cl. .................................................... 210/264,
210/279
[51] Int. Cl. ............................................... B01d 23/10
[50] Field of Search .......................................... 210/271,
272, 264, 275, 279, 276, 80

[56] References Cited
UNITED STATES PATENTS
560,777  5/1896  Church........................ 210/80

| 2,302,449 | 11/1942 | Laughlin ..................... | 210/273 |
| 2,639,000 | 5/1953 | Edwards...................... | 210/264X |
| 3,239,061 | 3/1966 | Horning et al. .............. | 210/273X |

*Primary Examiner*—Samih N. Zaharna
*Attorney*—Friedman and Goodman

ABSTRACT: The invention is directed to a pressurized self-cleaning compartmentalized filter tank which is adapted so that each compartment may be individually backwashed while remaining compartments continue to operate. This is accomplished by providing a backwash hood which acts in rotating association with a backwash valve assembly, said backwash hood and valve assembly being joined by, and on opposite ends of, a connecting rod therefor. By rotating the backwash hood and its attendant backwash valve assembly to the filter compartment desired to be backwashed, the individual compartment is backwashed, while the rest of the tank continues its filtration operation.

INVENTOR.
CHARLES L. KASS
BY
Friedman & Goodman
ATTORNEYS

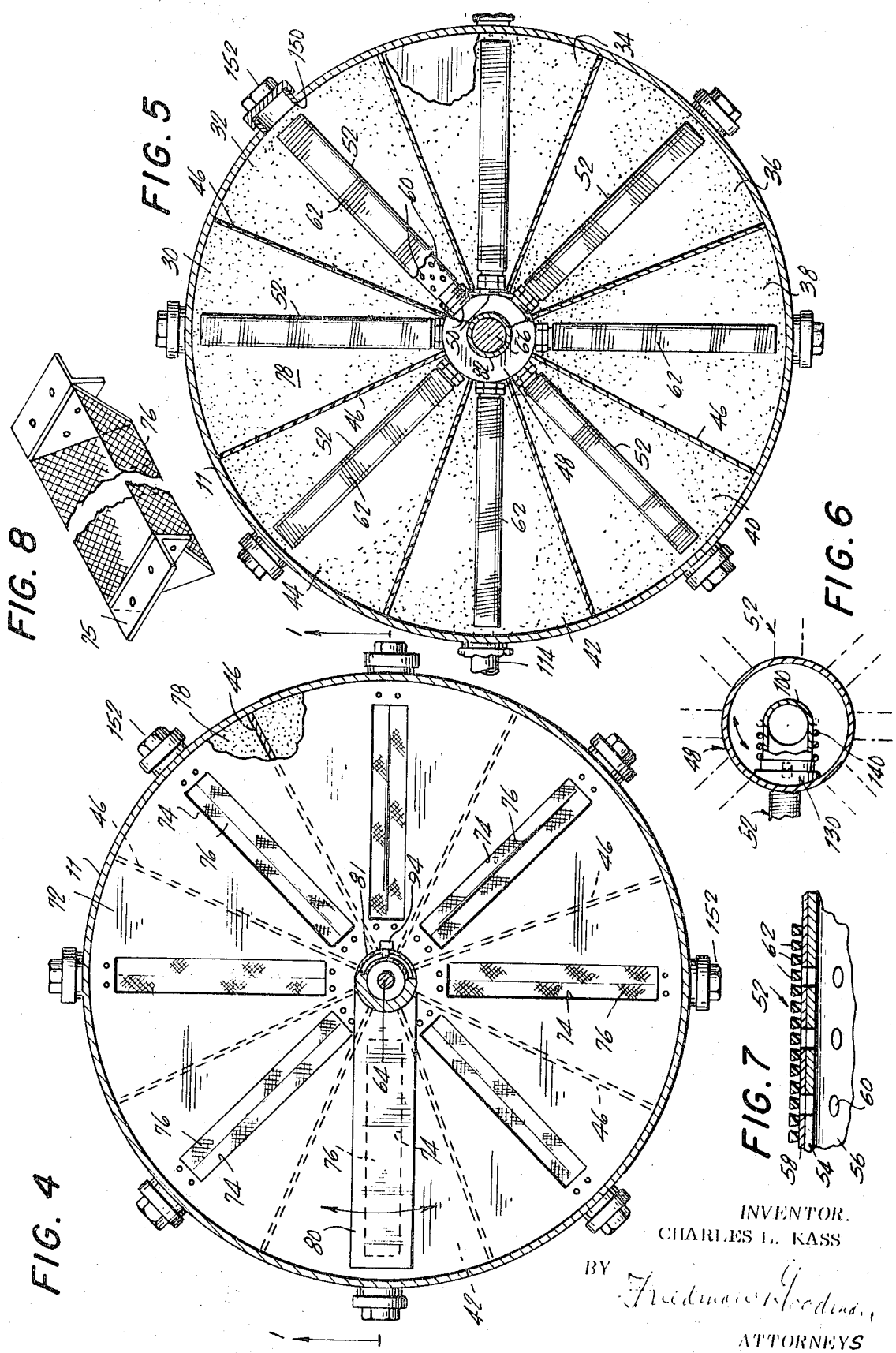

PRESSURIZED SELF-CLEANING FILTER TANK

BACKGROUND OF THE INVENTION

1. Field of the Invention

This invention relates generally to filter apparatus and more particularly to a filter which is self-cleaning.

2. Description of the Prior Art

Filter apparatus for filtering liquids or gases is, of course, well known. Generally, what is done is to pass an untreated liquid, such as raw water, through a filter media, such as sand, by means of gravity, and then collect the filtered water at the bottom of the tank, from which it is pumped to the desired location. Eventually, the filter media becomes clogged with the trapped particles coming from the raw liquid. At this point, the filtering operation is halted and the filter media is backwashed by reversing the flow of water therethrough. This discontinuation of the filtering operation is, of course, most inefficient in private and industrial use, as well as particularly uneconomical in industrial use. While multiple unit backwashing filters, in which individual units are backwashed, have been attempted, these suffer from the disadvantage that individual siphons must be provided for each unit resulting in a rather complicated apparatus.

SUMMARY OF THE INVENTION

It is, therefore, among one of the principal objectives of this invention to provide an improved filter tank which will be adapted to operate continuously with no stoppage due to backwashing.

In accordance with the present invention there has now been provided a self-cleaning compartmentalized filter tank which is adapted so that each compartment may be individually backwashed while the remainder of the tank continues its filtering operation. This is achieved by providing a backwash hood which acts in rotating association with a backwash valve assembly, said backwash hood and valve assembly being joined by a connecting rod and at the respective opposite ends thereof. The connecting rod is vertically located in a generally central position, inside the tank, and by rotating it the backwash hood is manipulated over the filter compartment desired to be backwashed, sealing it from the incoming unfiltered liquid. Meanwhile, the backwash valve acting in rotating aligned association with the backwash hood comes into registry with that compartment's inlet (or outlet) opening, as the case may be.

BRIEF DESCRIPTION OF THE DRAWING

The invention will be hereinafter more fully described with reference to the accompanying drawings, in which:

FIG. 4 is a view taken along line 4–4 of FIG. 1;

FIG. 5 is a view taken along line 5–5 of FIG. 1;

FIG. 6 is a view taken along line 6–6 of FIG. 3;

FIG. 7 is a fragmentary, sectional view of one of the underdrains of the tank; and FIG. 8 is a view in perspective of a screen employed at the top of each filter compartment.

DESCRIPTION OF THE PREFERRED EMBODIMENTS

Figure 1:
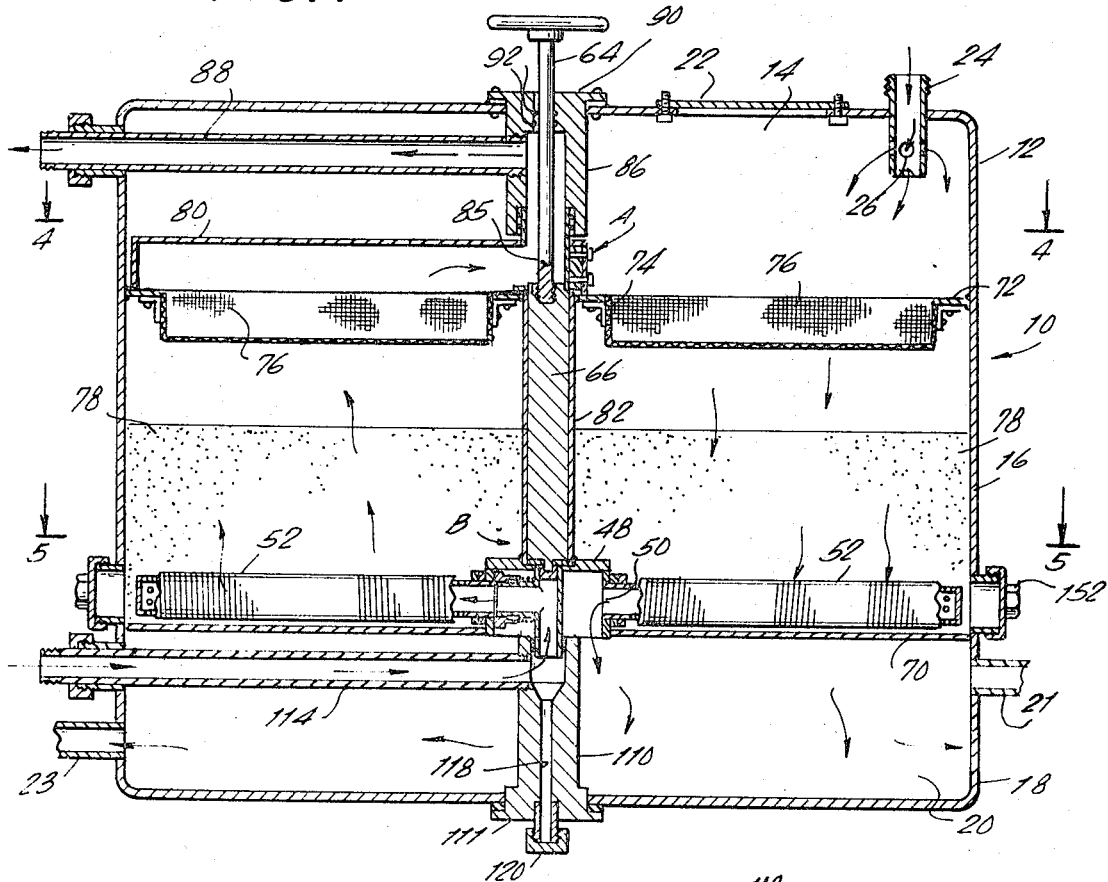
FIG. 1 is a cutaway elevational view of the improved filter tank, according to the invention, and showing the relative positions of the backwash hood and backwash valve assembly with regard to an individual compartment being backwashed.

Referring now to the FIGS. of the drawing, wherein like parts will be identified by like reference numerals, FIG. 1 depicts a filter tank 10 (for example, for a swimming pool, not shown, but not limited thereto) which is divided into three main sections, an upper section 12, defining a raw liquid collection chamber 14, a middle section 16 (which will be more fully described hereinbelow), and a lower section 18 defining a filtered liquid collection chamber 20. Tank 10 is of generally cylindrical shape and is secured to and rests on a suitable base support (not shown) which is of conventional design. Tank 10 is also provided with a tank head 22. In the top of tank 10, an inlet pipe 24 for raw water, or other unfiltered liquid, leads into collection chamber 14, said pipe 24 being provided with openings 26 in circular fashion around the pipe at its entering end so that the unfiltered fluid will be emitted in a generally horizontal fashion.

The middle section 16 is divided along its vertical plane into compartments, preferably as shown, into eight roughly equivalent "pie-wedge" or sector shaped compartments 30, 32, 34, 36, 38, 40, 42, 44 (FIG. 5), each compartment being separated by a radially extending wall 46. While eight radially divided sector shaped compartments are shown, it is clear that the invention is applicable to less than eight compartments but more than one; or it can be for more than eight compartments. The aforesaid compartments are joined together at the bottom by a common circular housing 48. In the housing 48, for each compartment there is an aperture 50 into each of which apertures 50 is inserted an underdrain 52 (also known as a well screen) which may be advantageously constructed in the manner described more fully in U.S. Pat. No. 3,221,819, but briefly consisting of a tube or body portion 54, having a hollow interior 56 for carrying the liquid, a plurality of ribs 58 provided on the outer surface of the body 54, a plurality of openings 60 formed through the wall of body 54, and finally a screen or filter element 62 surrounding the tube in winding fashion (FIG. 7).

Collection chamber 20 is provided with an exit pipe 21 at the upper portion thereof and with exit pipe 23 at the lower portion thereof, whose function will be described hereinbelow.

Proceeding vertically through the center of tank 10 is a rotating shaft 64 threadingly secured into a connecting rod 66 which extends the length of the middle section 16, which connecting rod is itself secured to a backwash valve assembly 68, which will be, subsequently, more fully described. A circular plate 70 integral with housing 48 provides a common bottom for all of the eight compartments, further providing a "false" bottom for the filter tank. Another circular plate 72 provides a common top for all of the eight compartments, with a course, rotating shaft 64 passing centrally therethrough.

A rectangular slot 74, extending in radial fashion from shaft 64 is provided in a generally central location in plate 72 for each respective compartment. Into each slot 74 is placed a screen section 76 which is suitably adapted to be fastened by conventional means into plate 72. Screen section 76 when viewed from the top has a rectangular configuration so that it will conform to rectangular slot 74, and its body is generally trough-shaped. A right angle bracket 75 is provided at each transverse end of screen 76 for conventionally fastening said screen to plate 72, e.g. bolts, etc.

Each compartment contains a suitable filter media, such as sand 78, up to about two-thirds of its height, or as desired.

The upper section 12 of tank 10 contains the backwash hood 80 which is of generally rectangular shape so that the hood 80 will sealingly overlie slot 74 and its screen 76 (note FIG. 4). Hood 80 can best be described as an open three-sided "box" with a rounded side 81 substituted for the missing transverse side. Hood 80 overlies screen 76 via its open longitudinal portion.

Figure 2:
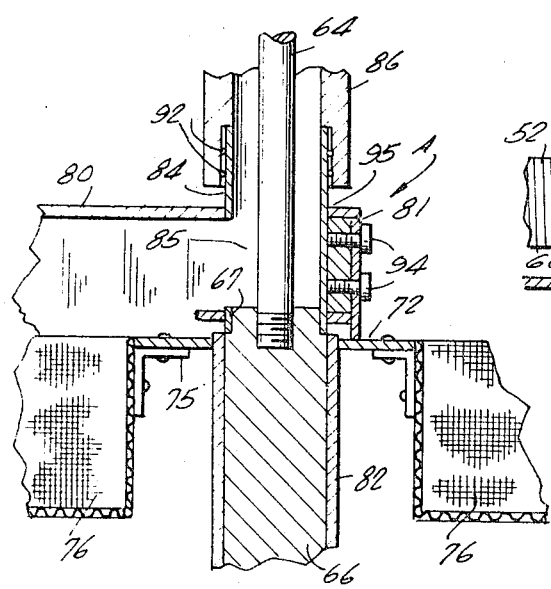
FIG. 2 is a fragmentary, sectional view of the upper portion "A" of the connecting rod showing the joinder of the backwash hood thereto.

Connecting rod 66 rotatingly turns inside a support tube 82. BAckwash hood 80 is attached at its rounded end 81 to a rotating tube 84 (FIG. 2) which tube 84 is inserted over a narrow portion 67 of the end of connecting rod 66 and is secured thereto, so that tube 84 resultingly rotates inside fitting 86 and support tube 82. Hood 80 is secured to tubing 84 by suitable fasteners 94 of conventional design (FIG. 2), tubing 84 passing through an aperture 95 provided for that purpose in rounded end 81 of hood 80. Tubing 84 has an aperture 85 which allows washwater to pass from the hood 80 into tubing 84 and out wash pipe 88 (as will be seen). Fitting 86 is a stationary annular fitting leading into the top of collection chamber 14 and has an exit waste pipe 88 (for wash water) connected at right angles thereto, leading to the outside of the tank. A plug 90 integral with fitting 86 provides a support for shaft 64, with rubber "O" rings 92 aiding in such support.

Figure 3:
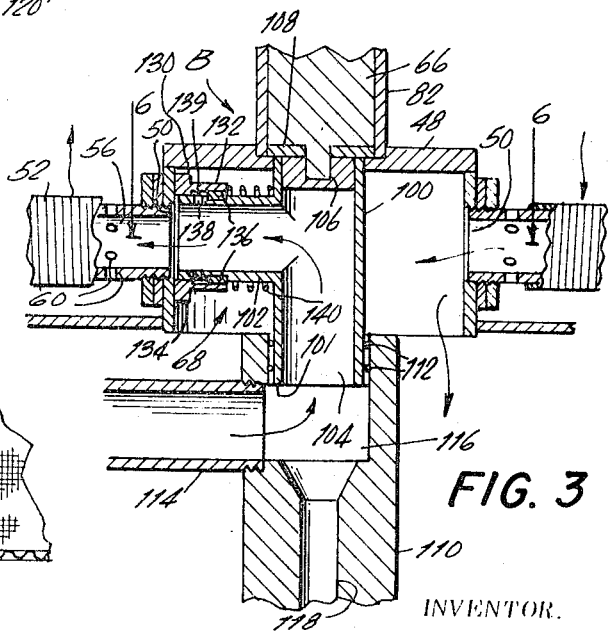
FIG. 3 is a fragmentary, sectional view of the lower portion "B" of the connecting rod and showing the relative position of backwash valve to compartment outlet.

Rotating at the lower end of connecting rod 66 and secured thereto is the backwash valve assembly 68 (FIG. 3). The valve assembly comprises a (right angle) valve entry into annular fitting 110 and communicating with a large bore 116 inside fitting 110, which large bore 116 tapers down to a smaller bore 118 which itself communicates with the outside of tank 10. A removable cap 120 seals the bore 118. Bore 118 may be fitted with a fitting to receive a pressurized gaseous supply to aid in the backwash process.

A sliding backwash shoe 130 is provided to liquid seal the end of arm 102 with the circular housing wall 48. Backwash shoe 130 is of generally annular shape so that it will be adapted to fit over the end of the arm 102 of valve 100. Backwash shoe 130 comprises a cylindrical body portion 132 which is integrally joined at one end thereof to a circular flange portion 134. Flange portion 134 abuts the inner wall of housing 148. The inner wall of shoe 130 has a smaller diameter bore at the flange 134 end thereof than at the body portion 132 thereof for a reason to be shown. An annular seal packing 136 is provided between body portion 132 and cylindrical arm 102. There is an opening 138 in the arm 102 which leads into the space 139 provided by the larger diameter bore portion of body portion 132 of shoe 130 and seal packing 136. A spring 140 is provided, between the valve fitting 100 and backwash shoe 130, whose tension is such as to push against said shoe.

Directly opposite each underdrain 52 (FIG. 5), in the wall 11 of tank 10 is provided an aperture 150 into which is inserted a suitable plug 152 which is force-fitted into the aperture 150 or is threaded therein, as desired. Thus, the underdrains 52 or filter media 78 may be easily removed and replaced from the outside of the tank, and also as will be seen without requiring significant shutdown of the filtration operation.

Describing now the operation of the invention filtration system with particular reference to FIGS. 1, 3 and 4 and 6, with the backwash hood 80 in overlying position over slot 74 and screen 76 of one of the compartments (42) of the tank (FIG. 4) and valve arm 102 sealingly overlying aperture 50 and its underdrain 52 in the same compartment (so that valve chamber 104 and the hollow portion 56 of tubular body 54 of underdrain 52 are in opening relation (FIG. 3) raw water to be filtered is pumped via water inlet pipe 24 into collection chamber 14 (FIG. 1). The water to be filtered passes through the screen sections 76 in all the compartments except the one whose screen is covered by the backwash hood 80, and the larger particles are trapped on top of the screen. From the screens, the water proceeds to filter down through the filter media 78 contained in the compartments of the tank and thence into underdrains 52. Finally, the filtered water passes, in the direction of the arrows, into apertures 50 from whence it is collected in collection chamber 20. From collection chamber 20, the filtered water passes out of exit pipe 21 to its desired destination.

A backwash pump (not shown) draws some of the filtered water, in the bottom of chamber 20, out of exit pipe 23 and pumps it back through wash water pipe 114 (in the direction of the arrows (FIG. 1) and into valve chamber 104 (FIG. 3) out through aperture 50 and into underdrain 52, from whence the filtered water is forced up through filter media (FIG. 1) expanding it and flushing the material trapped therein up through the rectangular slot 74 and the screen section 76 housed inside said slot and thence into backwash hood 80. The rectangular openings 74 with screens 76 prevent the loss of filter media and also permit more efficient cleaning. This is due to the principle of increased velocity of fluid flow from a large pie-shaped area through a smaller area, rectangular area 74. Finally, the wash water passes out through exit waste pipe 88, via aperture 85 (in tube 84) and tube 84.

The opening 138 in valve arm 102, mentioned above, allows water to enter into the space 139 of the backwash shoe thereby causing a buildup of fluid pressure against the shoe which acts to form a seal between the rotating valve arm and the aperture 50. The spring 140 also serves to apply pressure against the backwash shoe. Thus the backwash valve assembly of the invention utilizes both fluid and spring pressure to form the seal.

It can be seen that valve 100 turns inside housing 48, and thus valve arm 102 must be of a size to tightly turn inside said housing to initially provide as tight a seal as possible, with the backwash shoe supplying the finishing seal of valve arm to aperture, as hereinabove described.

This backwashing process is repeated (FIG. 6) in each compartment by merely rotating the backwash hood 80 and valve assembly 68, via rotating shaft 64, to the next compartment to be backwashed. The rotation of the entire assembly is accomplished, preferably, by a combination of a gear (not shown) attached to the shaft that rotates the backwash hood and valve and a gear that drives it. The drive gear is rotated by a ratchet drive (also not shown) which is attached to a drive gear. The ratchet is pulled a set distance by a pull solenoid which is activated by a timer and deactivated by a contact switch. The distance the ratchet travels is determined by the positioning of the backwash hood over the compartments. The rotation could also be accomplished manually, if desired, but this is less preferred.

Thus, an improved filter has been provided which will operate continuously with no stoppage for backwashing. By virtue of the screen sections, backwashing is accomplished without the loss of filter media. The invention also provides the added feature which allows for the changing of filter media and underdrain, compartment by compartment, from the outside thus providing for a means to change the filter media or underdrain in one compartment only. This feature permits a huge saving in shutdown time and filter media since only the one compartment need be changed to complete a repair or service.

Having thus described the invention as applied to specific embodiments thereof, it is to be understood that various changes may be made by those skilled in the art without departing from the spirit and scope thereof.

I claim:

1. A filter tank comprising a cylindrical enclosure having an upper section defining a filterable material collection chamber, a middle section consisting of a plurality of compartments each containing a screen section, filter media and an underdrain, external access means to each of said compartments, a lower section defining a filtered material collection chamber, said compartments being joined together at the bottom thereof by a common housing, opening means in said housing to each of said compartments, said underdrain being connected to said opening means, said filter tank being connected to inlet and outlet means, and means for simultaneously backwashing one of the compartments and carrying on filtration in the remainder thereof, said means comprising, in combination, means for arresting the flow of filterable material into the compartment to be backwashed acting in rotating association with backwash valve means, said means for arresting the flow of filterable material further comprising a hood member adapted to prevent filterable material from entering said compartment while permitting wash material coming from said compartment to pass therethrough, said hood member and valve means being joined by connecting means therefor, said valve means permitting the flow of said wash material therethrough into said compartment, said valve means further comprising a right angle valve fitting forming a valve chamber which is communicable with opening means into said compartment, a backwash shoe provided on said valve fitting to form a seal between said valve fitting and said opening means, said connecting means are disposed in the central vertical axis of said tank, said connecting means further comprising a connecting rod turningly disposed within a support tube therefor, said valve means being secured to the lower end of said connecting rod, said hood member being secured to the upper end of said connecting rod by means of a rotating tube secured to said connecting rod, a rotating shaft being secured to said connecting rod and leading to the outside of said tank, and said hood member and valve fitting being aligned on said connecting rod so that when said rotating shaft is actuated said hood member and valve fitting will associatingly rotate to the desired backwash disposition.

2. A filter tank according to claim 1, wherein said backwash shoe comprises an annular body adapted to fit over the right angle arm of said right angle valve fitting to form a seal between said valve and said opening means, said annular body further comprising a cylindrical body portion which is integrally joined at one end thereof to a circular outwardly extending flange portion, which flange portion abuts said opening means in sealing relation.

3. A filter tank according to claim 2, wherein spring means are provided to said backwash shoe to effect said sealing relation.

4. A filter tank according to claim 2, wherein said backwash shoe is adapted to employ fluidized pressure to effect said sealing relation.

5. A filter tank according to claim 1, wherein said compartments are sector shaped and are defined by radially extending walls.